F. H. SMITH.
BEARING.
APPLICATION FILED DEC. 27, 1910.
1,017,115.
Patented Feb. 13, 1912.
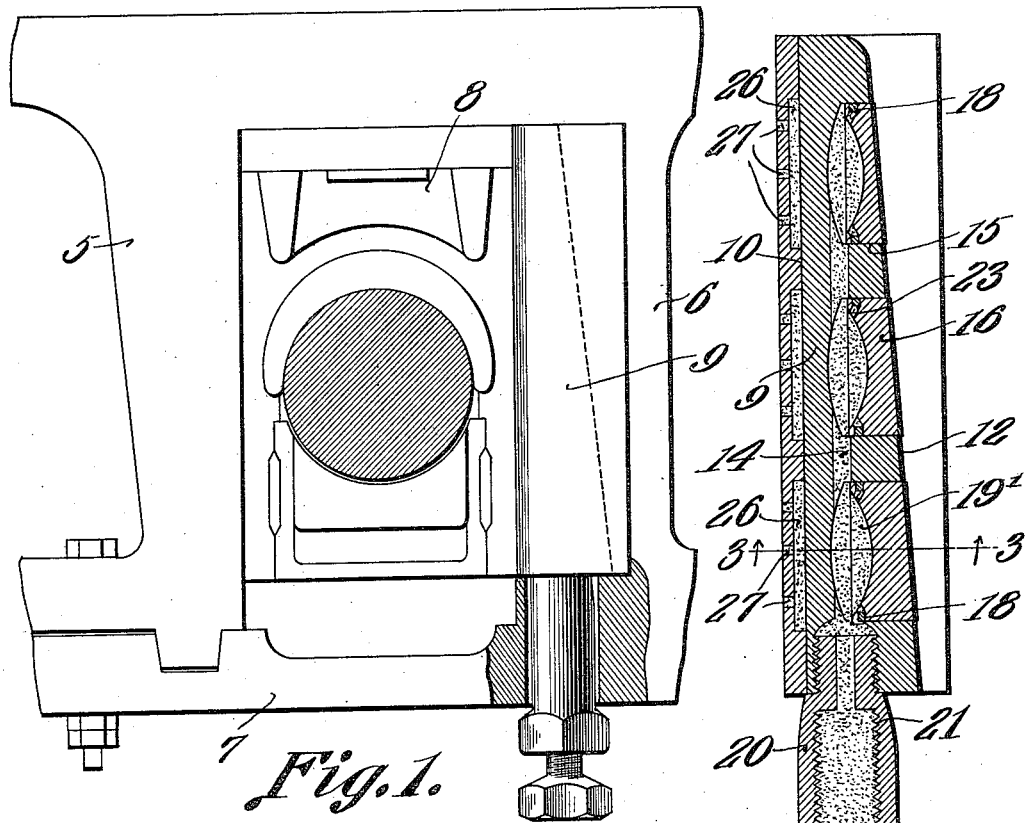
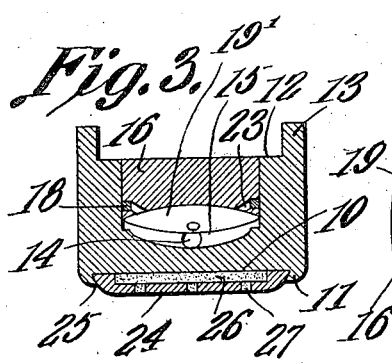
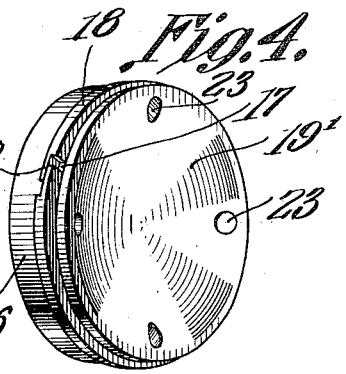
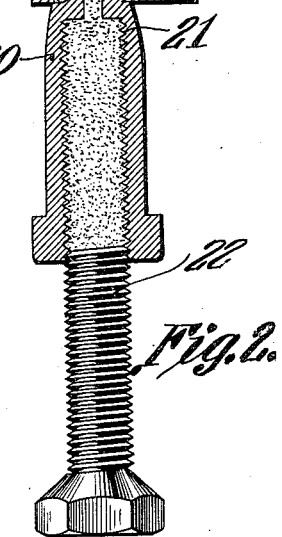
Frederick H. Smith,
Inventor
Witnesses
by C. A. Snow & Co.
Attorneys

UNITED STATES PATENT OFFICE.

FREDERICK H. SMITH, OF PITTSBURG, KANSAS.

BEARING.

1,017,115.   Specification of Letters Patent.   Patented Feb. 13, 1912.

Application filed December 27, 1910. Serial No. 599,365.

*To all whom it may concern:*

Be it known that I, FREDERICK H. SMITH, a citizen of the United States, residing at Pittsburg, in the county of Crawford and State of Kansas, have invented a new and useful Bearing, of which the following is a specification.

The present invention relates to journal bearings in general.

In those bearings which embody wedges which take up wear, the wedges are to be adjusted bodily and fit solidly between the related elements of the bearing. For this and other reasons, frequent adjustment of the wedge is rendered necessary.

The present invention therefore has as its primary object to provide an expansible wedge or other bearing element expanded by fluid pressure and in this manner adjusted to take up wear and have its engagement between the related elements of the bearing cushioned.

A further aim of the invention is to so construct the expansible wedge that it will, under the action of the fluid pressure, have a normal tendency to expand, so that wear will be automatically taken up. While it will of course be necessary at times to adjust the wedge, the adjustments are not required to be made so frequently as in the case when the wedge is solid.

The invention aims further to provide a fluid-cushioned bearing element.

Further the invention aims to provide a bearing wedge adapted to be disposed in relatively fixed relation between its companion element of the bearing and be adjusted solely by fluid pressure.

A further object of the invention is to provide an improved liner for bearing wedges.

In the accompanying drawings—Figure 1 is a view in elevation of a bearing here illustrated as one of the drive axle bearings of a locomotive, illustrating the principles of the invention embodied therein. Fig. 2 is a vertical sectional view in detail through the wedge of the bearing. Fig. 3 is a horizontal sectional view on the line 3—3 of Fig. 2 looking in the direction indicated by the arrows. Fig. 4 is a detailed perspective of one of the piston disks of the wedge.

In Fig. 1 of the drawings, the numeral 5 indicates a portion of the under frame of a locomotive and a jaw of this frame is indicated by the numeral 6, the bottom member of the frame being indicated by the numeral 7 and being firmly secured by bolts or other suitable fastening devices through the lower ends of the jaws of the frame. Mounted to slide in the frame, in the usual manner, is a bearing box 8 of the ordinary construction in which box is to be journaled the drive axle of the locomotive. One jaw of the frame indicated specifically by the numeral 6 has an inclined edge presented toward the box 8 and the wedge in the construction of which the principles of the present invention are embodied, is fitted between the inclined edge of the jaw 6 of the frame and the box 8.

The wedge embodying the principles of the invention includes a body 9 one face of which, indicated specifically by the numeral 10, is plane and parallel to the longitudinal axis of the body. At each side, this face has formed upon it an under cut flange 11 and fitted between the flanges and against the said face is the liner for the wedge, presently to be specifically described. The opposite face of the wedge is also plane and is inclined with respect to the longitudinal axis of the body of the wedge and to the plane of the first mentioned face 10. The last mentioned face of the wedge is indicated by the numeral 12 and at each side is formed with a flange 13 which flanges of course increase in height toward their ends corresponding to the end of the face 12 which is located near the longitudinal axis of the wedge. It is this latter face 12 which is moved against the inclined edge of the jaw 6 of the frame and the flanges 13 extend at opposite sides of the jaw so that the wedge is firmly held against lateral displacement.

The bottom bar 7 is held against the lower end of the wedge and serves to clamp the wedge in place, it being understood that this wedge is not adjustable in the direction of its length as is the ordinary wedge but is expanded in a manner to be presently explained, whereby to take up wear. The body of the wedge is formed with a longitudinally extending bore 14 which is in communication with a plurality of seats or sockets 15 formed in the face 12 of the body of the wedge. It is preferable that these sockets be circular and that the bore extend axially of the body so that the sockets decrease in depth in succession toward the upper end of the wedge in Fig. 2 of the drawing. It is furthermore preferable that the bore 14 should transect the bottoms of the seats or sockets 15 and that the bottom walls of the said seats should be concaved to a greater or less degree. By thus forming the seats and bore, the capacity of the seats is increased and liquid under pressure contained in the bore may more readily enter the seats than if constructed in some other manner. Fitted snugly within each seat is a piston disk 16 this disk being formed peripherally with a groove 17 in which is fitted a packing ring 18 split and having its ends overlapped as at 19 so as to prevent the escape around the ring of the liquid under pressure in the bore and seats. At this point it will be readily understood that while the disks 16 fit snugly and exactly in their respective sockets 15, they are capable of being forced out in the manner of a moving piston, due to the pressure of the fluid in the bore and seats. That the capacity of the seats may be further increased without materially adding to the thickness of the wedge, the inner faces of the piston disks 16 are concaved as at 19.

A bushing 20 is threaded at its upper end in the lower end of the bore 14 in the body of the wedge and extends through the bottom bar 7 of the frame and is interiorly screw threaded as at 21. A screw plug 22 is fitted in the bushing and at the time of initial adjustment of the wedge to the bearing, the plug assumes about the position shown in Fig. 2 of the drawing. When the wedge has been properly positioned and it is desired to tighten the same or in other words to expand the same between the jaws 6 of the frame, and the box, the plug 22 is screwed into the bushing 20 thereby placing the oil or grease which is illustrated as contained in and filling the bore 14 and seats 15 back of the piston disks under a greater or less degree of pressure. This compression of the grease or oil in the bore and seats will result in the piston disks being forced outwardly in the manner of a moving piston and against the edge of the jaws 6 of the frame. This movement of the piston disks will of course serve to bodily force the wedge, at its opposite side, against the box 8. In other words, the compression of the grease or oil in the bore and seats serves to expand the wedge between the jaws and box 8 and the said grease or oil under pressure in the body of the wedge serves as a cushion and, as the liner or box wears down, the tendency of the grease or oil to expand will cause the wedge to be automatically adjusted to take up this wear. In order to tighten the wedge in place, it is only necessary to further screw the plug 22 into the bushing 20, as will be readily understood.

In order to effectually prevent the leakage of grease or oil around the packing ring 18, each piston disk 16 is formed in its concaved face 19 with a plurality of openings 23 which communicate with the groove 17 in the periphery of the disks and serve to conduct a small quantity of the grease or oil to the packing ring for the purpose stated.

The liner for the wedge is indicated by the numeral 24 and is formed of a sheet of any suitable material disposed against the face 10 of the wedge body and having its side edges beveled as at 25 and fitting in the undercut flanges 11, of the said face 10. That face of the liner which is disposed against the wedge body is formed with recesses 26 designed to contain lubricant and with openings 27 which open into these recesses and serve to conduct the lubricant to the side of the box 8 which fits and slides against the liner.

From the foregoing description of the invention it will be readily understood that the principles of the invention may be embodied in any element of the journal bearing such for example as in the box 8 itself, or in the frame 5. Furthermore, it is not essential that the principles of the invention be embodied in an element of a bearing identical with that here illustrated as an element of any bearing may be in this manner constructed.

What is claimed is:

1. A journal-bearing wedge expanded by fluid pressure.
2. A journal-bearing wedge having a cushion under fluid pressure.
3. A journal-bearing wedge laterally expanded by fluid pressure.
4. A journal-bearing wedge embodying fluid pressure expanding means.
5. A journal-bearing wedge embodying a movable face, and fluid pressure adjusting means acting thereagainst.
6. A journal-bearing wedge having an adjustable element, and fluid pressure means for adjusting the element.
7. A journal-bearing wedge having an expansible element responsive to fluid pressure.
8. A fluid-cushioned journal-bearing wedge.
9. An expansible journal-bearing wedge containing a fluid, and means for compressing the fluid to expand the wedge.
10. An expansible journal-bearing wedge containing a fluid, and adjustable means for compressing the fluid to expand the wedge.
11. A journal-bearing wedge containing a fluid, an adjusting piston arranged to be acted upon by the fluid, and means for applying pressure to the fluid.
12. A journal-bearing wedge containing a fluid, an adjusting piston arranged to be acted upon by the fluid, and means for applying pressure to the fluid, the means being adjustable to vary the degree of pressure.
13. A journal-bearing wedge containing a fluid, adjusting pistons arranged to be acted upon in like manner by the fluid, and to like degree, and means for applying pressure to the fluid.

14. A journal-bearing wedge containing a fluid, adjusting pistons arranged to be acted upon in like manner by the fluid, and to like degree, and means for applying pressure to the fluid, the means being adjustable to vary the degree of pressure.

15. A journal-bearing element containing a fluid, an adjusting piston arranged to be acted upon by the fluid, and means for applying pressure to the fluid.

16. A journal-bearing wedge containing a fluid, a piston disk fitted in one face of the wedge and arranged to be acted upon by the fluid, and means for applying pressure to the fluid.

17. A journal-bearing wedge recessed in one face, a cushioning piston fitted in the wedge, the wedge being formed with a bore in communication with the recess, a cushioning piston disk fitted in the recess, a fluid in the bore and recess, and means closing the bore and exerting pressure upon the fluid.

18. A journal-bearing wedge formed in one face with a recess, the wedge being formed with a bore in communication with the recess, a cushioning disk fitted in the recess, a fluid in the bore and recess, and means closing the bore and adjustable to exert a greater or less degree of pressure upon the fluid.

19. A journal-bearing wedge formed in one face with a recess and having a bore in communication with the recess, a fluid in the bore and recess, a cushioning and adjusting piston disk fitted in the recess and arranged to be acted upon by the fluid, and means threaded into the bore and closing the same and arranged to exert a greater or less degree of pressure upon the fluid.

In testimony that I claim the foregoing as my own, I have hereto affixed my signature in the presence of two witnesses.

FREDERICK H. SMITH.

Witnesses:
C. W. PATMON,
W. G. WOLFE.

---

Copies of this patent may be obtained for five cents each, by addressing the "Commissioner of Patents Washington, D. C."